(12) United States Patent
Chen et al.

(10) Patent No.: US 11,761,818 B2
(45) Date of Patent: Sep. 19, 2023

(54) TEMPERATURE CONTROL METHOD FOR HEATING ELEMENT, NIGHT VISION SYSTEM CALIBRATION DEVICE AND SYSTEM

(71) Applicant: AUTEL INTELLIGENT TECHNOLOGY CORP., LTD., Guangdong (CN)

(72) Inventors: Yong Chen, Guangdong (CN); Xinguang Tang, Guangdong (CN)

(73) Assignee: AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 406 days.

(21) Appl. No.: 17/073,324

(22) Filed: Oct. 17, 2020

(65) Prior Publication Data

US 2021/0033468 A1 Feb. 4, 2021

Related U.S. Application Data

(63) Continuation of application No. PCT/CN2019/083531, filed on Apr. 19, 2019.

(30) Foreign Application Priority Data

Apr. 20, 2018 (CN) .......................... 201810362069.7

(51) Int. Cl.
*G01J 5/00* (2022.01)
*G05D 23/20* (2006.01)
*G01J 5/80* (2022.01)

(52) U.S. Cl.
CPC ............... *G01J 5/00* (2013.01); *G05D 23/20* (2013.01); *G01J 5/80* (2022.01); *G01J 2005/0077* (2013.01)

(58) Field of Classification Search
CPC ........ G01J 5/00; G01J 5/04; G01J 5/06; G01J 5/061; G01J 5/064; G01J 5/53;
(Continued)

(56) References Cited

U.S. PATENT DOCUMENTS

| | | | | |
|---|---|---|---|---|
| 8,324,564 B1* | 12/2012 | Pinkus | ...................... | G01J 5/53 |
| | | | | 250/252.1 |
| 8,564,879 B1* | 10/2013 | Eaton | ......................... | F41J 2/02 |
| | | | | 345/949 |
| 2011/0147369 A1* | 6/2011 | Spooner | ..................... | F41J 2/02 |
| | | | | 219/552 |

FOREIGN PATENT DOCUMENTS

| | | |
|---|---|---|
| CN | 103149556 A | 6/2013 |
| CN | 204301863 U | 4/2015 |
| CN | 204856029 U | 12/2015 |
| CN | 108318141 A | 7/2018 |

OTHER PUBLICATIONS

XP55798060A : "SR-800N Extended Area Blackbody Control Master" www.ci-systems.com.
(Continued)

*Primary Examiner* — David P Porta
*Assistant Examiner* — Meenakshi S Sahu (57) ABSTRACT

The present invention provides a temperature control method for a heating element, a night vision system calibration device and a system. The night vision system calibration device includes: a first housing, a heating element and a second housing covering the first housing. The heating element includes a heating area, a shape of the heating area being a shape of a target heating body used when a night vision system is calibrated. The second housing and the first housing form an accommodating cavity, and the heating element is disposed in the accommodating cavity. The second housing is provided with a through hole communicating with the accommodating cavity and adapted to the shape of the heating area, and the heating area is configured (Continued)

to emit infrared radiation through the through hole. In the temperature control method for a heating element, the night vision system calibration device and the system provided in the present invention, a target heating body for a night vision system used when the night vision system is calibrated may be provided, so that the night vision system after fault repair can be calibrated based on the target heating body, thereby improving the accuracy of the night vision system after the fault repair.

19 Claims, 5 Drawing Sheets

(58) Field of Classification Search
CPC .. G01J 2005/063; G01J 2005/065; G01J 5/10; G05D 23/20
See application file for complete search history.

(56) References Cited

OTHER PUBLICATIONS

XP55798056A:"Infrared Target—Infrared Target for Wide Range of E-O Testers", www.ci-systems.com.
XP32612623A: Zhang Yu et al. "Camera Calibration of Thermal-Infrared Stereo Vision System", 2013 Fourth International Conference on Intelligent Systems Design and Engineering Applications; 5 pages.
XP11443433A: Stephen Vidas et al. "A Mask-Based Approach for the Geometric Calibration of Thermal-Infrared Cameras", IEEE Transactions on Instrumentation and Measurement, vol. 61, No. 6, Jun. 2012; 11 pages.
Extended European Search Report dated May 3, 2021; Appln. No. 19788903.3.
International Search Report dated Jul. 4, 2019; PCT/CN2019/083531.

* cited by examiner

TEMPERATURE CONTROL METHOD FOR HEATING ELEMENT, NIGHT VISION SYSTEM CALIBRATION DEVICE AND SYSTEM

BACKGROUND

This application is a continuation application of International Application No. PCT/CN2019/083531, filed on Apr. 19, 2019, which claims priority of Chinese Patent Application No. 201810362069.7, filed on Apr. 20, 2018, which is incorporated herein by reference in its entirety.

TECHNICAL FIELD

The present application relates to automobile technologies, and in particular, to a temperature control method for a heating element, a night vision system calibration device and a system.

RELATED ART

An advanced driver assistance system (ADAS) may use various sensors (such as a camera, a radar, a laser, and an ultrasonic wave) installed on an automobile to sense surrounding environments during the running process of the automobile. When the sensors detect potential dangers, the ADAS gives an alarm to remind a driver, thereby effectively improving the driving comfort and safety of the automobile. The ADAS may include, for example, a lane departure warning system, a lane keeping system, a collision avoidance or pre-collision system, a night vision system, or the like.

The night vision system described above may use a principle of infrared thermal imaging at night by relying on an infrared camera installed on a front side of an automobile body to detect whether potential dangers such as pedestrians and animals exist in front of the automobile by using the principle of infrared thermal imaging, and provide the information to the driver. Therefore, the night vision system may widen the visual field of the driver at night, thereby avoiding traffic accidents. In addition, the night vision system may further help the driver see the front situation clearly in the glare of vehicle passing at night.

In the prior art, in the process of using the automobile, if software or hardware related to the night vision system fails, a target heating body used when the night vision system is calibrated cannot be provided after the software or hardware related to the night vision system is repaired. Consequently, the night vision system after the fault repair cannot be calibrated, and the accuracy of the night vision system after the fault repair is relatively low.

SUMMARY

The present invention provides a temperature control method for a heating element, a night vision system calibration device and a system, to resolve the technical problem in the prior art that a night vision system after fault repair cannot be calibrated due to the fact that a target heating body used when the night vision system is calibrated cannot be provided, and the accuracy of the night vision system after the fault repair is relatively low.

A first aspect of the present invention provides a night vision system calibration device, including: a first housing, a heating element and a second housing covering the first housing, where the heating element includes a heating area, a shape of the heating area being a shape of a target heating body used when a night vision system is calibrated, where the second housing and the first housing form an accommodating cavity, the heating element being disposed in the accommodating cavity; and the second housing is provided with a through hole communicating with the accommodating cavity and adapted to the shape of the heating area, and the heating area is used for emitting infrared radiation through the through hole.

In a possible implementation, the night vision system calibration device further includes a function switch and a circuit drive apparatus, where the circuit drive apparatus includes: a power module, a controller and a voltage converter, where the power module is electrically connected to a first end of the voltage converter and is configured to provide an input voltage;

a first end of the controller is electrically connected to the function switch, a second end of the controller is electrically connected to a second end of the voltage converter, and a third end of the voltage converter is electrically connected to the heating element; and the controller is configured to: when a drive signal sent by the function switch is received, control the voltage converter to convert the input voltage into a supply voltage of the heating element and output the supply voltage to the heating element.

In a possible implementation, the circuit drive apparatus further includes a first temperature sensor electrically connected to the controller, where the first temperature sensor is configured to detect an ambient temperature; and the controller is further configured to determine the supply voltage of the heating element according to the ambient temperature detected by the first temperature sensor, and indicate the supply voltage of the heating element to the voltage converter.

In a possible implementation, the circuit drive apparatus further includes a second temperature sensor electrically connected to the controller, where the second temperature sensor is configured to detect a temperature of the heating element; and the controller is further configured to obtain the temperature of the heating element detected by the second temperature sensor, and control the supply voltage output by the voltage converter to the heating element according to the temperature detected by the second temperature sensor.

In a possible implementation, the controller is further configured to control the voltage converter to adjust the supply voltage output to the heating element when it is determined that the temperature of the heating element is beyond a preset temperature range according to the temperature detected by the second temperature sensor.

In a possible implementation, the controller is further configured to control the supply voltage output by the voltage converter to the heating element to be less than a current supply voltage when it is determined that the temperature of the heating element is greater than a first preset threshold value.

In a possible implementation, the controller is further configured to control the voltage converter to stop supplying power to the heating element when it is determined that the temperature of the heating element is greater than the first preset threshold value.

In a possible implementation, the controller is further configured to control the supply voltage output by the voltage converter to the heating element to be greater than a current supply voltage when it is determined that the temperature of the heating element is less than a second preset threshold value.

In a possible implementation, the controller is further configured to control the voltage converter to start supplying power to the heating element when it is determined that the temperature of the heating element is less than the second preset threshold value.

In a possible implementation, the controller is further configured to control the voltage converter to stop supplying power to the heating element when heating duration of the heating element is greater than or equal to preset duration.

In a possible implementation, the controller is further configured to control the voltage converter to stop supplying power to the heating element when the temperature detected by the second temperature sensor is within the preset temperature range.

In a possible implementation, when the heating element includes at least two heating bodies, a quantity of the second temperature sensors is the same as a quantity of the heating bodies, each second temperature sensor is connected to the controller, and each second temperature sensor corresponds to one heating body and is configured to detect a temperature of the corresponding heating body.

In a possible implementation, a quantity of the voltage converters is the same as the quantity of the heating bodies, and each voltage converter is connected to one heating body, where the controller is further configured to control the supply voltage output by some or all voltage converters.

In a possible implementation, the heating element includes a first heating body and a second heating body, and when the shape of the heating area is cross-shaped, a surface of the first heating body facing the through hole and a surface of the second heating body facing the through hole are perpendicular to each other to form the heating area.

In a possible implementation, the night vision system calibration device further includes a first indicator lamp disposed on the second housing, the first indicator lamp being connected to the controller, where the controller is further configured to control the first indicator lamp to work when the temperature detected by the second temperature sensor is within the preset temperature range.

In a possible implementation, the night vision system calibration device further includes a power switch and a power interface disposed on the first housing or the second housing, where one end of the power interface is connected to an external power supply, and the other end of the power interface is connected to the power module through the power switch.

In a possible implementation, the night vision system calibration device further includes a second indicator lamp disposed on the second housing, the second indicator lamp being connected to the power switch, where when the power switch is in an on state, the second indicator lamp works.

In a possible implementation, the night vision system calibration device further includes an overcurrent protection apparatus disposed on the first housing or the second housing, the overcurrent protection apparatus being disposed between the power interface and the power module.

In a possible implementation, the first housing is a cube having an opening side, and the second housing covers the opening side of the cube.

In a possible implementation, the heating element is a heating copper foil.

In a possible implementation, the second housing is a heat insulation panel.

A second aspect of the present invention provides a temperature control method for a heating element, including:

receiving a drive signal; and supplying power to the heating element according to the drive signal, so that the heating element emits infrared radiation.

In a possible implementation, the method further includes:

obtaining an ambient temperature; and determining a supply voltage of the heating element according to the ambient temperature, where the supplying power to the heating element according to the drive signal includes:

using the determined supply voltage of the heating element to supply power to the heating element.

In a possible implementation, the method further includes:

obtaining a temperature of the heating element; and controlling the supply voltage output to the heating element according to the temperature of the heating element.

In a possible implementation, the controlling the supply voltage output to the heating element according to the temperature of the heating element includes:

adjusting the supply voltage output to the heating element when the temperature of the heating element is beyond a preset temperature range.

In a possible implementation, the adjusting the supply voltage output to the heating element when the temperature of the heating element is beyond a preset temperature range includes:

controlling the supply voltage output to the heating element to be less than a current supply voltage when the temperature of the heating element is greater than a first preset threshold value.

In a possible implementation, the controlling the supply voltage output to the heating element to be less than a current supply voltage when the temperature of the heating element is greater than a first preset threshold value includes:

stopping supplying power to the heating element when the temperature of the heating element is greater than the first preset threshold value.

In a possible implementation, the adjusting the supply voltage output to the heating element when the temperature of the heating element is beyond a preset temperature range includes:

controlling the supply voltage output to the heating element to be greater than a current supply voltage when the temperature of the heating element is less than a second preset threshold value.

In a possible implementation, the controlling the supply voltage output to the heating element to be greater than a current supply voltage when the temperature of the heating element is less than a second preset threshold value includes:

starting supplying power to the heating element when the temperature of the heating element is less than the second preset threshold value.

In a possible implementation, the method further includes:

stopping supplying power to the heating element when heating duration of the heating element is greater than or equal to preset duration.

In a possible implementation, the method further includes:

stopping supplying power to the heating element when the temperature of the heating element is within the preset temperature range.

A third aspect of the present invention provides an automotive night vision system calibration system, including an automobile and the night vision system calibration device according to any of the first aspect and the possible implementations of the first aspect, where the automobile is provided with an infrared camera, the night vision system is disposed in front of a running direction of the automobile, a distance between the night vision system calibration device and the automobile is greater than or equal to a preset distance, and a heating area of a heating element of the night vision system calibration device faces the automobile, so that infrared radiation emitted by the heating area is recognized by the infrared camera.

A fourth aspect of the present invention provides a storage medium, including an instruction, the instruction being used for being executed by a processor to perform the method according to any of the second aspect and the possible implementations of the second aspect.

A fifth aspect of the present invention provides a computer program product, including an instruction, the instruction being used for performing the method according to any of the second aspect and the possible implementations of the second aspect.

In the temperature control method for a heating element, the night vision system calibration device and the system provided in the present invention, the target heating body to be used when the night vision system is calibrated may be provided to a night vision system, so that the night vision system after fault repair can be calibrated based on the target heating body, thereby improving the accuracy of the night vision system after the fault repair.

BRIEF DESCRIPTION OF THE DRAWINGS

To describe the technical solutions in embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

DESCRIPTION OF REFERENCE NUMERALS 1. first housing; 2. heating element;
3. second housing; 4. through hole;
5. first heating body; 6. second heating body;
7. circuit drive apparatus; 8. power module;
9. controller; 10. voltage converter;
11. function switch; 12. first temperature sensor;
13. second temperature sensor; 14. first indicator lamp;
15. mechanical temperature switch; 16. power switch;
17. power interface; 18. overcurrent protection apparatus;
19. second indicator lamp; 20. handle;
21. laser penetration hole; 22. fixed frame; and
23. laser.

DETAILED DESCRIPTION

The following clearly and completely describes the technical solutions in the embodiments of the present invention with reference to the accompanying drawings in the embodiments of the present invention. Obviously, the described embodiments are only some embodiments instead of all embodiments of the present invention. All other embodiments obtained by a person of ordinary skill in the art based on the embodiments of the present invention without creative efforts shall fall within the protection scope of the present invention.

A night vision system may use a principle of infrared thermal imaging at night by relying on an infrared camera installed on a front side of an automobile body to detect whether potential dangers such as pedestrians and animals exist in front of the automobile by using the principle of infrared thermal imaging, and provide the potential dangers to the driver. Therefore, the night vision system may widen the visual field of the driver at night, thereby avoiding traffic accidents. In addition, the night vision system may further help the driver see the front situation clearly in the glare of vehicle passing at night.

In the prior art, in the process of using the automobile, if software or hardware related to the night vision system fails, a target heating body used when the night vision system is calibrated cannot be provided after the software or hardware related to the night vision system is repaired. Therefore, the night vision system after the fault repair cannot be calibrated, and the accuracy of the night vision system after the fault repair is relatively low.

Considering the foregoing problems, the present invention provides a night vision system calibration device, which may provide the target heating body to be used when the night vision system is calibrated to the night vision system, so that the night vision system after fault repair can be calibrated based on the target heating body, thereby improving the accuracy of the night vision system after the fault repair. The night vision system described herein may include, but is not limited to, a night vision system installed on a vehicle (for example, an automobile). The night vision system calibration device provided in the present invention can be adopted as long as any night vision system that is calibrated by using the target heating body.

The following describes the night vision system calibration device provided in the present invention in detail through some embodiments. The following embodiments may be mutually combined, and same or similar concepts or processes may not be repeatedly described in some embodiments.

Figure 1A:
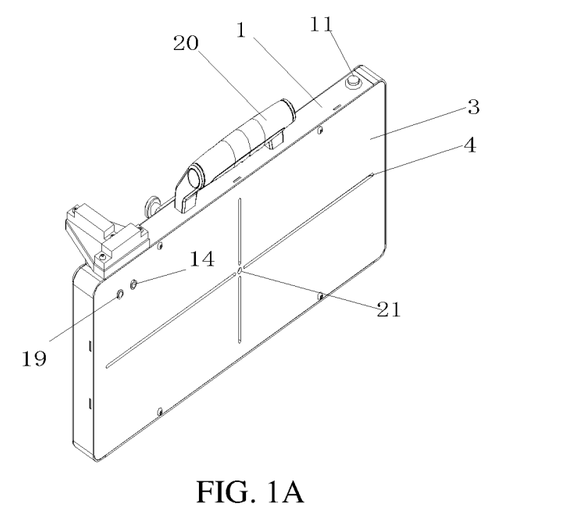
FIG. 1A is a schematic diagram of an overall structure of a night vision system calibration device according to the present invention.
Figure 1B:
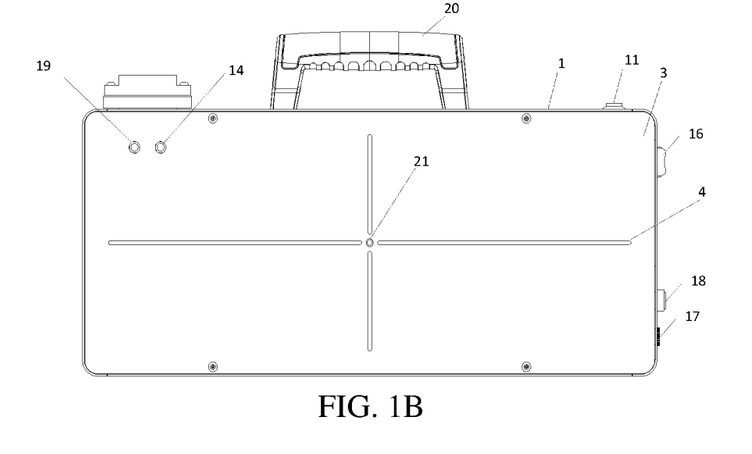
FIG. 1B is a front view of FIG. 1A.
Figure 1C:
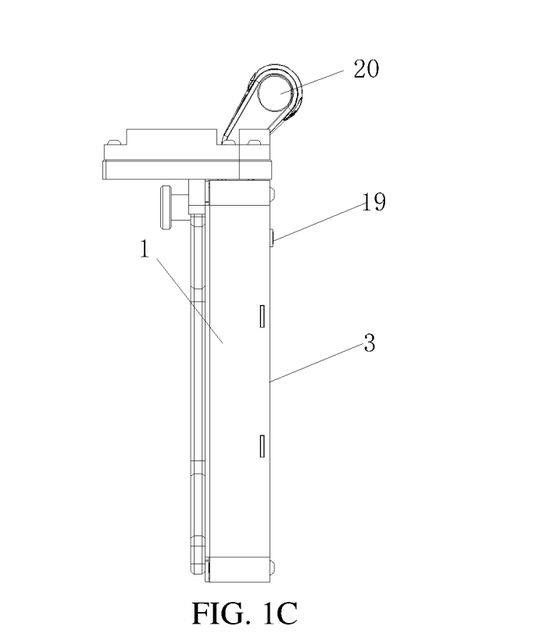
FIG. 1C is a left view of FIG. 1A.
Figure 1D:
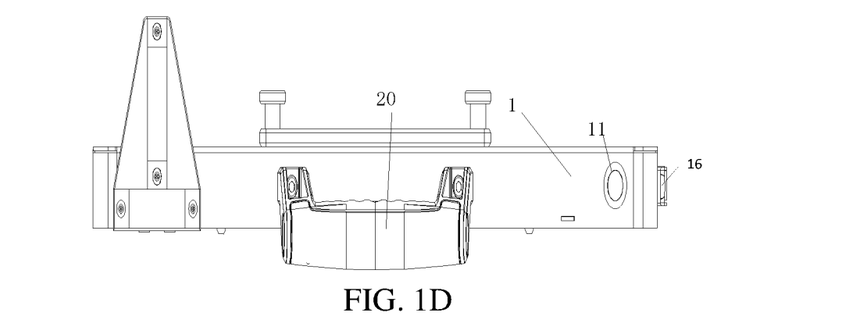
FIG. 1D is a top view of FIG. 1A.
Figure 2:
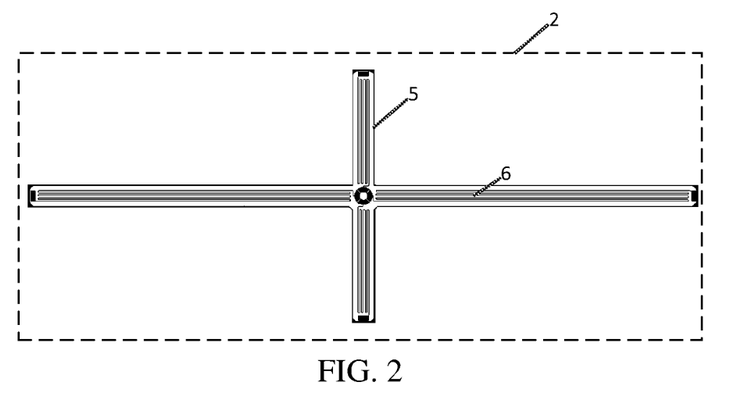
FIG. 2 is a schematic diagram of a heating element according to the present invention.

FIG. 1A is a schematic diagram of an overall structure of a night vision system calibration device according to the present invention. FIG. 1B is a front view of FIG. 1A. FIG. 1C is a left view of FIG. 1A. FIG. 1D is a top view of FIG. 1A. FIG. 2 is a schematic diagram of a heating element 2 according to the present invention.

With reference to FIG. 1A, FIG. 1B, FIG. 1C, FIG. 1D and FIG. 2, the night vision system calibration device provided in the present invention includes: a first housing 1, a heating element 2 and a second housing 3 covering the first housing 1. The heating element 2 includes a heating area, a shape of the heating area being a shape of a target heating body used when a night vision system is calibrated, such as a cross shape, a circle, a ring shape, or a square. For example, when the shape of the target heating body used when the night vision system is calibrated is the cross shape, the heating element 2 may be as shown in FIG. 2. During specific implementation, the heating element 2 may be any device having a heating function, for example, a heating copper foil.

The second housing 3 and the first housing 1 form an accommodating cavity, the heating element 2 being disposed in the accommodating cavity. The second housing 3 is provided with a through hole 4 communicating with the accommodating cavity and adapted to the shape of the heating area. That is, a shape of the through hole 4 corresponds to the shape of the heating area. The heating area is used for emitting infrared radiation through the through hole 4.

The second housing 3 is configured to insulate heat emitted by other devices of the night vision system calibration device except the heating area of the heating element 2. During specific implementation, the second housing 3 may be any housing having a heat insulation function, such as a heat insulation panel. Shapes of the first housing 1 and the second housing 3 are not limited in the present invention. For example, the first housing 1 is a cube having an opening side, and the second housing 3 covers the opening side of the cube. Alternatively, the second housing 3 is a cube having an opening side, and the first housing 1 covers the opening side of the cube. FIG. 1A to FIG. 1D show an example of the night vision system calibration device in which the first housing 1 is a cube having an opening side and the second housing 3 covers the opening side of the cube.

The heating element 2 may be fixedly disposed (for example, screwed) on one side of the second housing 3 facing the accommodating cavity, or may be fixedly disposed on one side of the first housing 1 facing the accommodating cavity. FIG. 1A to FIG. 1D show the night vision system calibration device in which the heating element 2 is fixedly disposed on one side of the second housing 3 facing the accommodating cavity. That is, when the heating element 2 is fixedly disposed on the side of the second housing 3 facing the accommodating cavity, the heating area of the heating element 2 is oppositely disposed on the side of the second housing 3 facing the accommodating cavity. When the heating element 2 is fixedly disposed on the side of the first housing 1 facing the accommodating cavity, the heating area of the heating element 2 is oppositely disposed on the side of the first housing 1 facing the accommodating cavity.

Because shapes of the heating area and the through hole 4 are all the shape of the target heating body used when the night vision system is calibrated, a thermal imaging shape formed by emitting the infrared radiation through the through hole 4 by the heating area is the same as the shape of the target heating body used when the night vision system is calibrated. Therefore, after the fault repair is carried out on the software or hardware related to the night vision system, the night vision system after the fault repair can be calibrated by using the night vision system calibration device.

A night vision system of an automobile is used as an example. When the night vision system of the automobile after the fault repair is calibrated, the night vision system calibration device may be disposed in front of a running direction of the automobile. A distance between the night vision system calibration device and the automobile may be greater than or equal to a preset distance. The preset distance may be specifically determined according to calibration requirements of the night vision system. When the heating area emits the infrared radiation through the through hole 4 of the second housing 3, the infrared camera of the automobile may recognize the infrared radiation emitted by the heating area through the through hole 4 of the second housing 3, so that the night vision system of the automobile may recognize the infrared radiation by using the infrared camera to obtain the shape of the target heating body used for calibrating the night vision system. Then, an operator may calibrate the night vision system after the fault repair based on the shape of the target heating body to correct the accuracy of the night vision system after the fault repair, thereby improving the accuracy of the night vision system after the fault repair. For how the operator calibrates the night vision system based on the shape of the target heating body, reference may be made to the prior art. This is not involved in the present invention.

An example in which the shape of the target heating body used when the night vision system is calibrated is the cross shape (that is, the shape of the heating area of the night vision system calibration device is the cross shape) is used for describing the heating body of the night vision system calibration device provided in the present invention in detail.

Specifically, the night vision system calibration device further includes a function switch 11 and a circuit drive apparatus 7. The function switch may be disposed on the first housing 1 or the second housing 3. FIG. 1A to FIG. 1D show the night vision system calibration device in which the function switch 11 is disposed on the first housing 1. The circuit drive apparatus 7 may be disposed in the accommodating cavity formed by the first housing 1 and the second housing 3. For example, the circuit drive apparatus 7 may be fixedly disposed (for example, screwed) on the side of the second housing 3 facing the accommodating cavity, or may be fixedly disposed on the side of the circuit drive apparatus 7 facing the accommodating cavity. In this case, the heating element may be located between the circuit drive apparatus 7 and the second housing 3.

Figure 3:
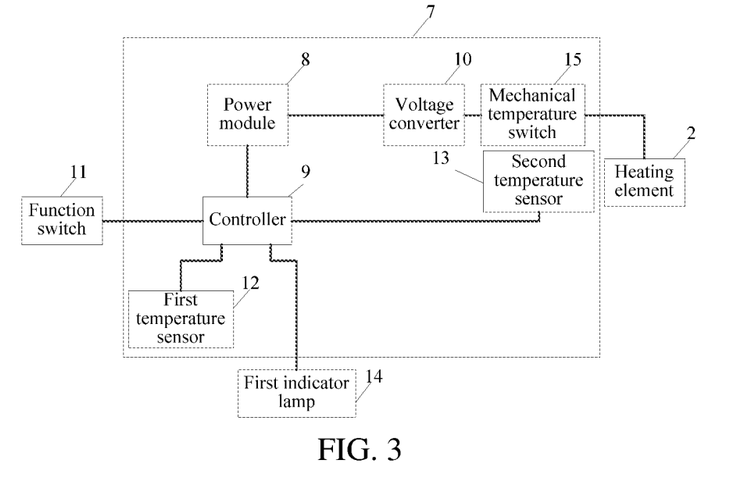
FIG. 3 is a schematic circuit diagram of a circuit drive apparatus according to the present invention.

FIG. 3 is a schematic circuit diagram of a circuit drive apparatus 7 according to the present invention. As shown in FIG. 3, the circuit drive apparatus 7 includes: a power module 8, a controller 9 and a voltage converter 10. When the function switch 11 is specifically implemented, the controller 9 may be any chip having processing and control functions, such as a single-chip microcomputer and a processor. The voltage converter 10 may be any chip having a function of increasing or decreasing a voltage. The function switch 11 and the controller 9 may be powered by the power module 8 or by a power supply disposed inside themselves.

The power module 8 is connected to a first end (for example, an input end) of the voltage converter 10 and is configured to provide an input voltage. The input voltage may be a direct current voltage, for example, a direct current voltage of 12 V. A first end (for example, a control end) of the controller 9 is electrically connected to the function switch 11, a second end (for example, an output end) of the controller 9 is electrically connected to a second end (for example, a control end) of the voltage converter 10, and a third end (for example, an input end) of the voltage converter 10 is electrically connected to a third end (for example, an input end) of the heating element 2.

In the present invention, the operator may trigger the function switch 11 to send a drive signal to the controller 9 by long pressing the function switch 11. The controller 9 is configured to: when the drive signal sent by the function switch 11 is received, control the voltage converter 10 to convert the input voltage into a supply voltage of the heating element 2 and output the supply voltage to the heating element 2. When being powered on, the heating element 2 may continuously generate heat, so that the infrared radiation can be emitted outwards through the through hole 4 of the second housing 3.

The supply voltage of the heating element 2 may be a fixed voltage or a voltage determined according to an ambient temperature. When the supply voltage of the heating element 2 is determined according to the ambient temperature, the circuit drive apparatus 7 may further include a first temperature sensor 12 electrically connected to the controller 9.

The first temperature sensor 12 is configured to detect the ambient temperature. The controller 9 is further configured to determine the supply voltage of the heating element 2 according to the ambient temperature detected by the first temperature sensor 12, and indicate the supply voltage of the heating element 2 to the voltage converter 10. For example, when the ambient temperature is relatively high, the controller may instruct the voltage converter 10 to use a relatively low supply voltage to supply power to the heating element 2. When the ambient temperature is relatively low, the controller may instruct the voltage converter to use a relatively high supply voltage to supply power to the heating element 2. In this way, it is possible to reduce power consumption while supplying power to the heating element 2.

Further, the circuit drive apparatus 7 may further include a second temperature sensor 13 electrically connected to the controller 9. The second temperature sensor 13 is configured to detect a temperature of the heating element 2. The controller 9 is further configured to obtain the temperature of the heating element 2 detected by the second temperature sensor 13, and control the supply voltage output by the voltage converter 10 to the heating element 2 according to the temperature detected by the second temperature sensor 13.

For example, the controller 9 may control the voltage converter 10 to stop supplying power to the heating element 2 when the temperature detected by the second temperature sensor 13 is within a preset temperature range, and/or control the voltage converter 10 to adjust the supply voltage output to the heating element 2 when it is determined that the temperature of the heating element 2 is beyond the preset temperature range according to the temperature detected by the second temperature sensor 13.

During specific implementation, an example in which a maximum value of the preset temperature range is a first preset threshold value and a minimum value is a second preset threshold value is used. For example, that the controller 9 controls the voltage converter 10 to adjust the supply voltage output to the heating element 2 when it is determined that the temperature of the heating element 2 is beyond the preset temperature range according to the temperature detected by the second temperature sensor 13 may include:

controlling the supply voltage output by the voltage converter 10 to the heating element 2 to be less than a current supply voltage when it is determined that the temperature of the heating element 2 is greater than the first preset threshold value; and controlling the supply voltage output by the voltage converter 10 to the heating element 2 to be greater than a current supply voltage when it is determined that the temperature of the heating element 2 is less than the second preset threshold value. In this way, heat generation and heat dissipation of the heating element 2 can be balanced, so that the temperature of the heating element 2 is continuously kept within the preset temperature range.

As an example, alternatively, the controller 9 may directly control the voltage converter 10 to stop supplying power to the heating element 2 when it is determined that the temperature of the heating element 2 is greater than the first preset threshold value, thereby reducing the power consumption. Correspondingly, after stopping supplying power to the heating element 2, if the temperature of the heating element 2 is less than the minimum value of the preset temperature range (that is, the second preset threshold value), the controller 9 may control the voltage converter 10 to start supplying power to the heating element 2, so that the temperature of the heating element 2 may be kept within the preset temperature range. In this way, it is possible to reduce the power consumption while ensuring that the temperature of the heating element 2 is kept within the preset temperature range. Values of the first preset threshold value and the second preset threshold value in the preset temperature range may be greater than a value of the ambient temperature, and may be specifically determined according to the calibration requirements of the night vision system.

By using the foregoing manner, the temperature of the heating element 2 may be kept within the preset temperature range relatively constantly, so that the infrared radiation emitted by the heating element 2 can be accurately detected when the night vision system is calibrated, thereby improving the calibration efficiency and accuracy.

When the circuit drive apparatus 7 includes the second temperature sensor 13, the controller 9 is further configured to control the voltage converter 10 to stop supplying power to the heating element 2 when the temperature of the heating element 2 is greater than a high temperature threshold value. The high temperature threshold value exceeds the first preset threshold value. In this way, overheated burnout of the night vision system calibration device can be avoided. A specific value of the high temperature threshold value may be set according to user requirements.

Further, the controller 9 may be further configured to control the voltage converter 10 to stop supplying power to the heating element 2 when heating duration of the heating element 2 is greater than or equal to preset duration. The preset duration may be specifically determined according to a time required for calibrating the night vision system. In this way, after the calibration of the night vision system is finished, the night vision system calibration device may automatically stop working.

Further, the night vision system calibration device may further include a first indicator lamp 14, the first indicator lamp 14 being connected to the controller 9. The controller 9 is further configured to control the first indicator lamp 14 to work when the temperature detected by the second temperature sensor 13 is within the preset temperature range. In this way, the controller 9 may represent whether the temperature of the heating element 2 is within the preset temperature range by using different flashing modes of the first indicator lamp 14 to indicate to the operator calibrating the night vision system whether the night vision system can be calibrated by using the night vision system calibration device.

For example, when the heating element 2 is heated, the controller 9 may control the first indicator lamp 14 to continuously flash. When the temperature of the heating element 2 is within the preset temperature range, the controller 9 may control the first indicator lamp 14 to be always on. In this way, the operator may determine, through the first indicator lamp 14, whether the calibration operation of the night vision system may be started. The first indicator lamp 14 may be, for example, a light emitting diode (LED). The first indicator lamp 14 may be disposed on the second housing 3 for ease of viewing by the operator.

Further, the circuit drive apparatus 7 may further include a mechanical temperature switch 15. The mechanical temperature switch 15 is disposed between the voltage converter 10 and the heating element 2, and is in contact with the heating element 2. In this way, when the temperature of the heating element 2 is greater than a threshold of the mechanical temperature switch 15, the mechanical temperature switch 15 may automatically disconnect the voltage converter 10 from the heating element 2. A temperature threshold of the mechanical temperature switch 15 may be specifically set according to the user requirements.

In this way, when the night vision system calibration device is out of control (for example, dead), overheated burnout of the circuit drive apparatus 7 due to continuous power supply to the heating body can be avoided.

It can be understood that the heating element 2 may be of an integrated structure, may further include at least two heating bodies, and may be specifically determined according to the shape of the target heating body used when the night vision system is calibrated. When the heating element 2 includes at least two heating bodies, a quantity of the second temperature sensors 13 is the same as a quantity of the heating bodies, each second temperature sensor 13 is connected to the controller 9, and each second temperature sensor 13 corresponds to one heating body to detect a temperature of the corresponding heating body. Correspondingly, a quantity of the voltage converters 10 is the same as the quantity of the heating bodies, and each voltage converter 10 is connected to one heating body. In this scenario, the controller 9 may control the supply voltage output by some or all voltage converters 10 by using the foregoing method. That is, the controller 9 may adjust the supply voltage of some heating bodies.

The heating element 2 shown in FIG. 2 is used as an example. The heating element 2 may be of an integrated structure. In another embodiment, the heating element 2 may include a first heating body 5 and a second heating body 6. One side of the first heating body 5 facing the through hole 4 and one side of the second heating body 6 facing the through hole 4 are perpendicular to each other to form a cross-shaped heating area. The first heating body 5 and the second heating body 6 may be, for example, a device that can generate heat, such as a heating copper foil.

As described above, the power module 8 is configured to provide the input voltage. This embodiment does not limit manners in which the power module 8 provides the input voltage. For example, the power module 8 may provide the input voltage by means of an external battery or by means of an external power supply.

When the power module 8 provides the input voltage by means of the external power supply, the night vision system may further include a power switch 16 and a power interface 17 disposed on the first housing 1 or the second housing 3. FIG. 1A to FIG. 1D show the night vision system calibration device in which the power switch 16 and the power interface 17 are disposed on the first housing 1.

One end of the power interface 17 is connected to the external power supply, and the other end of the power interface 17 is connected to the power module 8 through the power switch 16. When the power switch 16 is turned on, the external power supply is connected to the power module 8 to provide the input voltage to the power module 8. During specific implementation, the power interface 17 may be connected, through a power adapter, to an alternating current or a power supply provided by other power supply devices, so that the power adapter may convert the alternating current to the input voltage required by the power module 8.

Further, the night vision system calibration device may further include an overcurrent protection apparatus 18 disposed on the first housing 1 or the second housing 3. FIG. 1A to FIG. 1D show the night vision system calibration device in which the overcurrent protection apparatus 18 is disposed on the first housing 1. The overcurrent protection apparatus 18 is located between the power interface 17 and the power module 8, and is configured to provide overcurrent protection. In this way, burnout of chips or devices on the circuit drive apparatus 7 can be avoided. During specific implementation, the overcurrent protection apparatus 18 may be, for example, a fuse.

Further, the night vision system calibration device may further include a second indicator lamp 19, the second indicator lamp 19 being connected to the power switch 16. When the power switch 16 is in an on state, the second indicator lamp 19 works and is configured to indicate to the operator calibrating the night vision system whether the external power supply is connected to the power module 8. For example, when the second indicator lamp 19 is on, it indicates that the external power supply is connected to the power module 8. When the second indicator lamp 19 is off, it indicates that the external power supply is disconnected from the power module 8. During specific implementation, the second indicator lamp 19 may be, for example, an LED. The second indicator lamp 19 may be disposed on the second housing 3. To be easily distinguished from the first indicator lamp 14, the first indicator lamp 14 and the second indicator lamp 19 may be disposed at different positions of a heat insulation panel, or the first indicator lamp 14 and the second indicator lamp 19 adopts different colors.

It should be noted that, when the night vision system calibration device has a waterproof function, the function switch 11 of the night vision system calibration device may be a waterproof function switch, the power interface 17 is a waterproof power interface 17, the power switch 16 is a waterproof power switch 16, the overcurrent protection apparatus 18 is a waterproof overcurrent protection apparatus 18, and both the first indicator lamp 14 and the second indicator lamp 19 are waterproof indicator lamps. The through hole 4 of the second housing 3 is covered with a transparent waterproof material such as transparent glass or transparent resin, and a contact position of the second housing 3 and the first housing 1 is provided with a waterproof rubber ring to form a sealed accommodating cavity for protecting the heating element 2 located in the accommodating cavity, so as to achieve a waterproof effect. In addition, By covering the transparent waterproof material on the through hole 4 of the second housing 3, the heating area of the heating element 2 may emit infrared thermal radiation through the through hole 4, and the infrared radiation emitted by other devices except the heating area may be further prevented from being recognized by the infrared camera of the automobile.

Optionally, one side of the first housing 1 may be further provided with a handle 20, so as to facilitate the operator to carry the night vision system calibration device.

Figure 4:
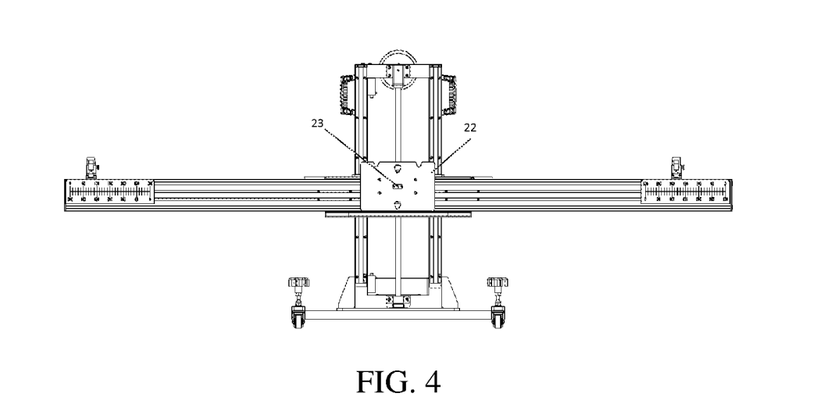
FIG. 4 is a schematic structural diagram of a holder.

In addition, when the night vision system is calibrated by the night vision system calibration device using the function switch 11, the power interface 17, the power switch 16, the overcurrent protection apparatus 18, the first indicator lamp 14 and the second indicator lamp 19, the night vision system calibration device may be directly placed on the ground, or may be placed on a holder. FIG. 4 is a schematic structural diagram of a holder. As shown in FIG. 4, when the night vision system calibration device is placed on the holder, the night vision system calibration device may be specifically placed (for example, mounted) on a fixed frame 22 of the holder. One side of the first housing 1 of the night vision system calibration device away from the second housing 3 faces the fixed frame 22. The holder is provided with a laser 23. Optionally, the first housing 1, the second housing 3, the heating element 2 and the circuit drive apparatus 7 of the night vision system calibration device may be provided with a laser penetration hole 21 through which laser light emitted by the laser 23 can penetrate. In this way, the operator can determine whether the position at which the night vision system calibration device is placed meets the calibration requirements by determining whether the laser light emitted by the laser 23 is aligned with the infrared camera of the automobile. It can be understood that, the holder on which the night vision system calibration device is placed may be, for example, an existing lifting holder, and details are not described one by one herein.

The night vision system of the automobile is used as an example. The working process of the night vision system calibration device provided in the present invention is described with reference to the night vision system calibration device shown in FIG. 1A to FIG. 1D, FIG. 2 and FIG. 3. The night vision system calibration device is placed on the holder shown in FIG. 4.

Specifically, the operator of the fixed frame 22 can determine whether the position at which the night vision system calibration device is placed meets the calibration requirements by determining whether the laser light emitted by the laser 23 of the holder is aligned with the infrared camera of the automobile. After the night vision system calibration device is placed, the operator can connect the external power supply to the power interface 17 of the night vision system calibration device and turn on the power switch 16 of the night vision system calibration device. In this case, the second indicator lamp is always on. Then, the operator triggers the function switch 11 to send a drive signal to the controller 9 by long pressing the function switch 11.

After receiving the drive signal, the controller 9 may determine the supply voltage of the heating element 2 according to the obtained ambient temperature detected by the first temperature sensor 12. Then, the controller 9 may indicate the supply voltage of the heating element 2 to the voltage converter 10, and instruct the voltage converter 10 to convert the input voltage into a supply voltage of the heating element 2 and output the supply voltage to the heating element 2. In this case, the controller 9 may control the first indicator lamp 14 to flash to indicate to the operator through the first indicator lamp 14 that heating of the heating element 2 is started.

In the process of heating the heating element 2, the controller 9 may obtain the temperature of the heating element 2 detected by the second temperature sensor 13. If the temperature of the heating element 2 is within the preset temperature range, the controller 9 may control the first indicator lamp 14 to be always on to indicate to the operator through the first indicator lamp 14 that the night vision system may be calibrated by using the night vision system calibration device.

In this case, the operator may recognize the infrared radiation emitted by the heating element 2 by using the infrared camera by operating the night vision system of the automobile to obtain the shape of the target heating element used for calibrating the night vision system. Then, the operator may calibrate the night vision system after fault repair based on the shape of the target heating body to correct the accuracy of the night vision system after the fault repair, thereby improving the accuracy of the night vision system after the fault repair.

In addition, in the process in which the operator calibrates the night vision system after the fault repair based on the night vision system calibration device, the controller 9 may obtain the temperature of the heating element 2 detected by the second temperature sensor 13. For example, if the temperature of the heating element 2 exceeds the first preset threshold value, the voltage converter 10 is controlled to reduce the supply voltage of the heating element 2. If the temperature of the heating element 2 is less than the second preset threshold value, the voltage converter 10 is controlled to improve the supply voltage of the heating element 2. By using the foregoing manner, the temperature of the heating element 2 may be kept in the preset temperature range relatively constantly, so that the infrared radiation emitted by the heating element 2 can be accurately detected when the night vision system is calibrated, thereby improving the calibration efficiency and accuracy.

If the temperature of the heating element 2 not only exceeds the first preset threshold value but also exceeds the high temperature threshold value, the controller 9 controls the voltage converter 10 to stop supplying power to the heating element 2, thereby avoiding overheated burnout of the night vision system calibration device.

Further, the controller 9 is further provided with preset duration. The preset duration may be specifically determined according to a time required for calibrating the night vision system. Therefore, the controller 9 may further record heating duration of the heating element 2 while controlling the first indicator lamp 14 to be always on, and control the voltage converter 10 to stop supplying power to the heating element 2 when the heating duration is greater than or equal to the preset duration. In this way, the night vision system calibration device may automatically stop working after the calibration of the night vision system is finished, and the operator does not need to manually close the night vision system calibration device.

The night vision system calibration device provided in the present invention may provide the target heating body to be used when the night vision system is calibrated to the night vision system, so that the night vision system after fault repair can be calibrated based on the target heating body, thereby improving the accuracy of the night vision system after the fault repair. In addition, the night vision system calibration device provided in the present invention has features such as accurate temperature control, simple control mode, low manufacturing costs, and high reliability.

Figure 5:
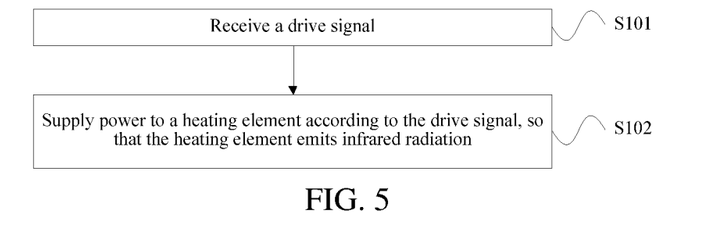
FIG. 5 is a schematic flowchart of a temperature control method for a heating element according to the present invention.

Based on the night vision system calibration device shown in FIG. 1A to FIG. 1D, the present invention further provides a temperature control method for a heating element. FIG. 5 is a schematic flowchart of a temperature control method for a heating element according to the present invention. An execution body of the method may be a night vision system calibration device or may also be a controller in the night vision system calibration device. The night vision system calibration device is used as an example to describe the method provided in the present invention below.

As shown in FIG. 5, the method includes the following steps.

S101. Receive a drive signal.

S102. Supply power to the heating element according to the drive signal, so that the heating element emits infrared radiation.

Optionally, the night vision system calibration device may obtain an ambient temperature, and determine a supply voltage of the heating element according to the ambient temperature. The night vision system calibration device may use the determined supply voltage to supply power to the heating element, so that the heating element emits the infrared radiation.

Optionally, the night vision system calibration device may further obtain a temperature of the heating element, and control the supply voltage output to the heating element according to the temperature of the heating element.

For example, when the temperature of the heating element is beyond a preset temperature range, the night vision system calibration device adjusts the supply voltage output to the heating element. In an implementation, when the temperature of the heating element is greater than a first preset threshold value of the preset temperature range, the night vision system calibration device may control the supply voltage output to the heating element to be less than a current supply voltage. As an example, the night vision system calibration device may stop supplying power to the heating element. In another implementation, when the temperature of the heating element is less than a second preset threshold value, the night vision system calibration device may control the supply voltage output to the heating element to be greater than the current supply voltage. As an example, the night vision system calibration device may start supplying power to the heating element.

Optionally, when heating duration of the heating element is greater than or equal to preset duration, the night vision system calibration device may further stop supplying power to the heating element.

Optionally, when the temperature of the heating element is within the preset temperature range, the night vision system calibration device may further stop supplying power to the heating element.

Figure 6:
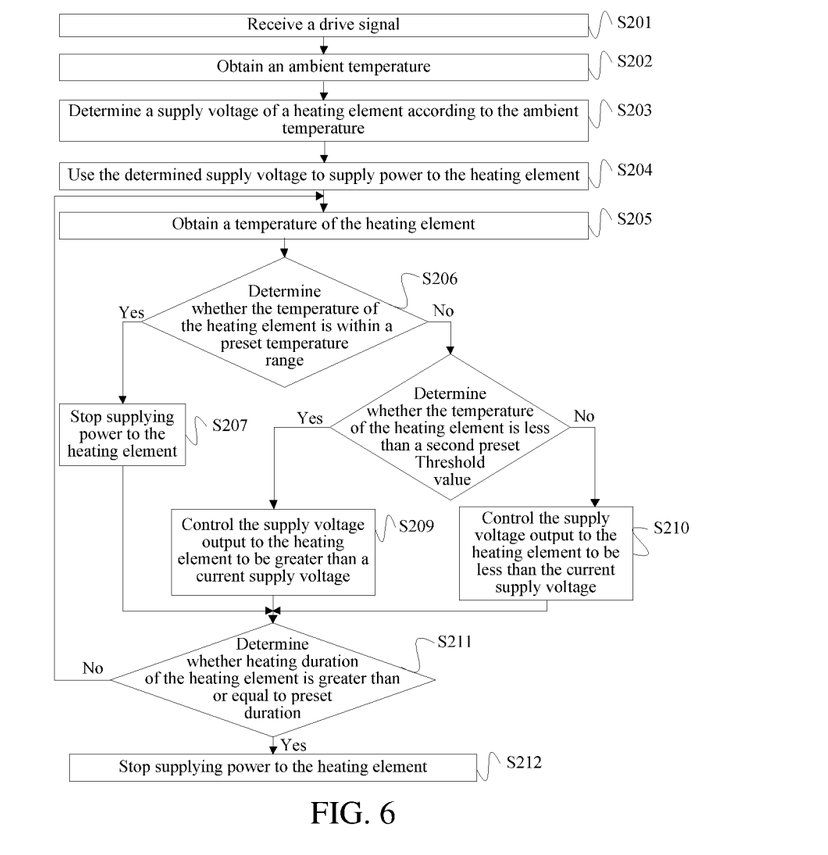
FIG. 6 is a complete flowchart of a temperature control method for a heating element according to the present invention.

FIG. 6 is a complete flowchart of a temperature control method for a heating element according to the present invention. As shown in FIG. 6, the method includes the following steps.

S201. Receive a drive signal.

S202. Obtain an ambient temperature.

S203. Determine a supply voltage of the heating element according to the ambient temperature.

S204. Use the determined supply voltage to supply power to the heating element.

S205. Obtain a temperature of the heating element.

S206. Determine whether the temperature of the heating element is within a preset temperature range. If the temperature of the heating element is within the preset temperature range, S207 is performed, or otherwise, S208 is performed.

S207. Stop supplying power to the heating element.

After S207 is performed, S211 is performed.

In this case, the night vision system calibration device may further control the first indicator lamp 14 to be always on to indicate to the operator through the first indicator lamp 14 that the night vision system may be calibrated by using the night vision system calibration device.

S208. Determine whether the temperature of the heating element is less than a second preset threshold value. If the temperature of the heating element is less than the second preset threshold value, S209 is performed, or otherwise, S210 is performed.

S209. Control the supply voltage output to the heating element to be greater than a current supply voltage.

After S209 is performed, S211 is performed.

S210. Control the supply voltage output to the heating element to be less than the current supply voltage.

S211. Determine whether heating duration of the heating element is greater than or equal to preset duration. If the heating duration of the heating element is greater than or equal to the preset duration, S212 is performed, or otherwise, S205 is performed.

S212. Stop supplying power to the heating element.

After S212 is performed, the process ends.

The temperature control method for a heating element provided in the present invention may be used for controlling the heating element in the night vision system calibration device to provide the target heating body to be used when the night vision system is calibrated to the night vision system. For the implementation principle and the technical effect, reference may be made to the description of the night vision system calibration device, and details are not described herein.

Another aspect of the present invention further provides an automotive night vision system calibration system, including an automobile and the night vision system calibration device according to the foregoing embodiments.

The automobile may be provided with a night vision system, including an infrared camera. The infrared camera described herein may be a common camera using an infrared imaging principle in the prior art. The automobile described herein may be a common automobile structure in the prior art, and details are not describe herein.

The night vision system calibration device is disposed in front of a running direction of the automobile, and a distance between the night vision system calibration device and the automobile is greater than or equal to a preset distance. A heating area of a heating element of the night vision system calibration device faces the automobile, so that infrared radiation emitted by the heating area is recognized by the infrared camera.

For how the automotive night vision system calibration system implements the calibration of the night vision system, reference may be made to the description of the foregoing embodiments, and details are not describe herein.

In the present invention, the terms "first", "second", and the like are used for descriptive purposes only and are not to be construed as indicating or implying a relative importance. Orientation or position relationships indicated by the terms such as "upper", "lower", "top" and "bottom" are based on orientation or position relationships shown in the accompanying drawings, and are used only for ease of describing the present invention, rather than indicating or implying that the mentioned apparatus or component needs to have a particular orientation or needs to be constructed and operated in a particular orientation. Unless otherwise explicitly specified or defined, the terms such as "install" and "connection" should be understood in a broad sense. For example, the connection may be a fixed connection, a detachable connection, or an integral connection. A persons of ordinary skill in the art may understand the specific meanings of the foregoing terms in the present invention according to specific situations.

In the descriptions of this specification, descriptions of reference terms "an implementation", "some implementations", "an exemplary implementation", "an example", "a specific example" or "some examples" mean that specific features, structures, materials or characteristics described with reference to the implementation or example are included in at least one implementation or example of the present invention. In this specification, schematic descriptions of the foregoing terms do not necessarily directed at a same implementation or example. In addition, the described specific features, structures, materials or characteristics can be combined in a proper manner in any one or more implementations or examples.

Finally, it should be noted that the foregoing embodiments are merely used for describing the technical solutions of the present invention, but are not intended to limit the present invention. Although the present invention is described in detail with reference to the foregoing embodiments, a person of ordinary skill in the art should understand that, modifications may still be made to the technical solutions in the foregoing embodiments, or equivalent replacements may be made to part or all of the technical features; and these modifications or replacements will not cause the essence of corresponding technical solutions to depart from the scope of the technical solutions in the embodiments of the present invention.

What is claimed is:

1. A night vision system calibration device, comprising: a first housing, a heating element and a second housing covering the first housing, wherein the heating element comprises a heating area, a shape of the heating area being a shape of a target heating body used when a night vision system is calibrated, wherein
   the second housing and the first housing form an accommodating cavity, the heating element being disposed in the accommodating cavity; and
   the second housing is provided with a through hole communicating with the accommodating cavity and adapted to the shape of the heating area, and the heating area is used for emitting infrared radiation through the through hole;
   a function switch and a circuit drive apparatus, wherein the circuit drive apparatus comprises: a power module, a controller and a voltage converter, wherein
   the power module is electrically connected to a first end of the voltage converter and is configured to provide an input voltage;
   a first end of the controller is electrically connected to the function switch, a second end of the controller is electrically connected to a second end of the voltage converter and a third end of the voltage converter is electrically connected to the heating element; and
   the controller is configured to: when a drive signal sent by the function switch is received, control the voltage converter to convert the input voltage into a supply voltage of the heating element and output the supply voltage to the heating element, wherein the supply voltage is determined according to a temperature.

2. The device according to claim 1, wherein the circuit drive apparatus further comprises a first temperature sensor electrically connected to the controller, wherein the first temperature sensor is configured to detect an ambient temperature; and the controller is further configured to determine the supply voltage of the heating element according to the ambient temperature detected by the first temperature sensor, and indicate the supply voltage of the heating element to the voltage converter.

3. The device according to claim 1, wherein the circuit drive apparatus further comprises a second temperature sensor electrically connected to the controller, wherein the second temperature sensor is configured to detect a temperature of the heating element; and the controller is further configured to obtain the temperature of the heating element detected by the second temperature sensor, and control the supply voltage output by the voltage converter to the heating element according to the temperature detected by the second temperature sensor.

4. The device according to claim 3, wherein
   the controller is further configured to control the voltage converter to adjust the supply voltage output to the heating element when it is determined that the temperature of the heating element is beyond a preset temperature range according to the temperature detected by the second temperature sensor.

5. The device according to claim 4, wherein
   the controller is further configured to control the supply voltage output by the voltage converter to the heating element to be less than a current supply voltage when it is determined that the temperature of the heating element is greater than a first preset threshold value.

6. The device according to claim 5, wherein
   the controller is further configured to control the voltage converter to stop supplying power to the heating element when it is determined that the temperature of the heating element is greater than the first preset threshold value.

7. The device according to claim 4, wherein
   the controller is further configured to control the supply voltage output by the voltage converter to the heating element to be greater than a current supply voltage when it is determined that the temperature of the heating element is less than a second preset threshold value.

8. The device according to claim 7, wherein
   the controller is further configured to control the voltage converter to start supplying power to the heating element when it is determined that the temperature of the heating element is less than the second preset threshold value.

9. The device according to claim 3, wherein
   the controller is further configured to control the voltage converter to stop supplying power to the heating element when heating duration of the heating element is greater than or equal to preset duration.

10. The device according to claim 9, wherein
    the controller is further configured to control the voltage converter to stop supplying power to the heating element when the temperature detected by the second temperature sensor is within the preset temperature range.

11. The device according to claim 3, wherein
    when the heating element comprises at least two heating bodies, a quantity of the second temperature sensors is the same as a quantity of the heating bodies, each second temperature sensor is connected to the controller, and each second temperature sensor corresponds to one heating body and is configured to detect a temperature of the corresponding heating body.

12. The device according to claim 11, wherein a quantity of the voltage converters is the same as the quantity of the heating bodies, and each voltage converter is connected to one heating body; and the controller is further configured to control the supply voltage output by some or all voltage converters.

13. The device according to claim 11, wherein the heating element comprises a first heating body and a second heating body, and when the shape of the heating area is cross-shaped, a surface of the first heating body facing the through hole and a surface of the second heating body facing the through hole are perpendicular to each other to form the heating area.

14. The device according to claim 3, further comprising a first indicator lamp disposed on the second housing, the first indicator lamp being connected to the controller, wherein the controller is further configured to control the first indicator lamp to work when the temperature detected by the second temperature sensor is within the preset temperature range.

15. The device according to claim 1, further comprising a power switch and a power interface disposed on the first housing or the second housing, wherein one end of the power interface is connected to an external power supply, and the other end of the power interface is connected to the power module through the power switch.

16. The device according to claim 15, further comprising a second indicator lamp disposed on the second housing, the second indicator lamp being connected to the power switch, wherein when the power switch is in an on state, the second indicator lamp works.

17. The device according to claim 15, further comprising an overcurrent protection apparatus disposed on the first housing or the second housing, the overcurrent protection apparatus being disposed between the power interface and the power module.

18. The device according to claim 1, wherein the first housing is a cube having an opening side, and the second housing covers the opening side of the cube.

19. The device according to claim 1, wherein the heating element is a heating copper foil.

* * * * *